United States Patent [19]

White et al.

[11] Patent Number: 4,778,089
[45] Date of Patent: Oct. 18, 1988

[54] AUTOMOBILE CLOTHES HANGER BRACKET

[76] Inventors: Michael T. White, 833 W. 57th Ter., Kansas City, Mo. 64123; Paul S. Francis, 997 Pennsylvania, Kansas City, Mo. 64105

[21] Appl. No.: 115,391

[22] Filed: Nov. 2, 1987

[51] Int. Cl.⁴ ............................................... B60R 7/08
[52] U.S. Cl. .............................. 224/42.46 A; 224/313; 224/42.45 A; 211/105.3; 248/214; 248/340
[58] Field of Search ............... 224/42.45 A, 42.45 R, 224/42.46 A, 42.46 R, 42.01, 313; 211/123, 105.3, 105.1, 172, 118; 248/214, 340

[56] References Cited

U.S. PATENT DOCUMENTS

| | | | |
|---|---|---|---|
| 2,335,030 | 11/1943 | Rotheraine | 211/105.3 |
| 3,002,666 | 10/1961 | Silverman | 224/42.45 A |
| 3,481,483 | 12/1969 | Harvey et al. | 224/42.46 R |
| 3,708,093 | 1/1973 | Toms, II | 224/42.45 A |
| 4,577,766 | 3/1986 | Miller | 211/123 |
| 4,632,255 | 12/1986 | Kennedy | 211/105.3 |

Primary Examiner—Renee S. Luebke
Attorney, Agent, or Firm—Kokjer, Kircher, Bradley, Wharton, Bowman & Johnson

[57] ABSTRACT

A bracket for installation in a vehicle to provide support for hanging clothes. The bracket includes an extensible and retractable rod formed by two telescoping tubes which are circumferentially grooved to hold clothes hangers in place. An adjustable sleeve is fitted on the larger tube and carries both an L-shaped hook element which can be hooked on a grab bar in the vehicle and a U-shaped bail which can be hung on a clothing hook in the vehicle as an alternative way of supporting the clothing rod. The bail can be pivoted to a storage position when not used. An adjustable brace on one end of the rod engages the window frame of the vehicle to stabilize the rod in a horizontal position.

20 Claims, 2 Drawing Sheets

U.S. Patent    Oct. 18, 1988    Sheet 2 of 2    4,778,089
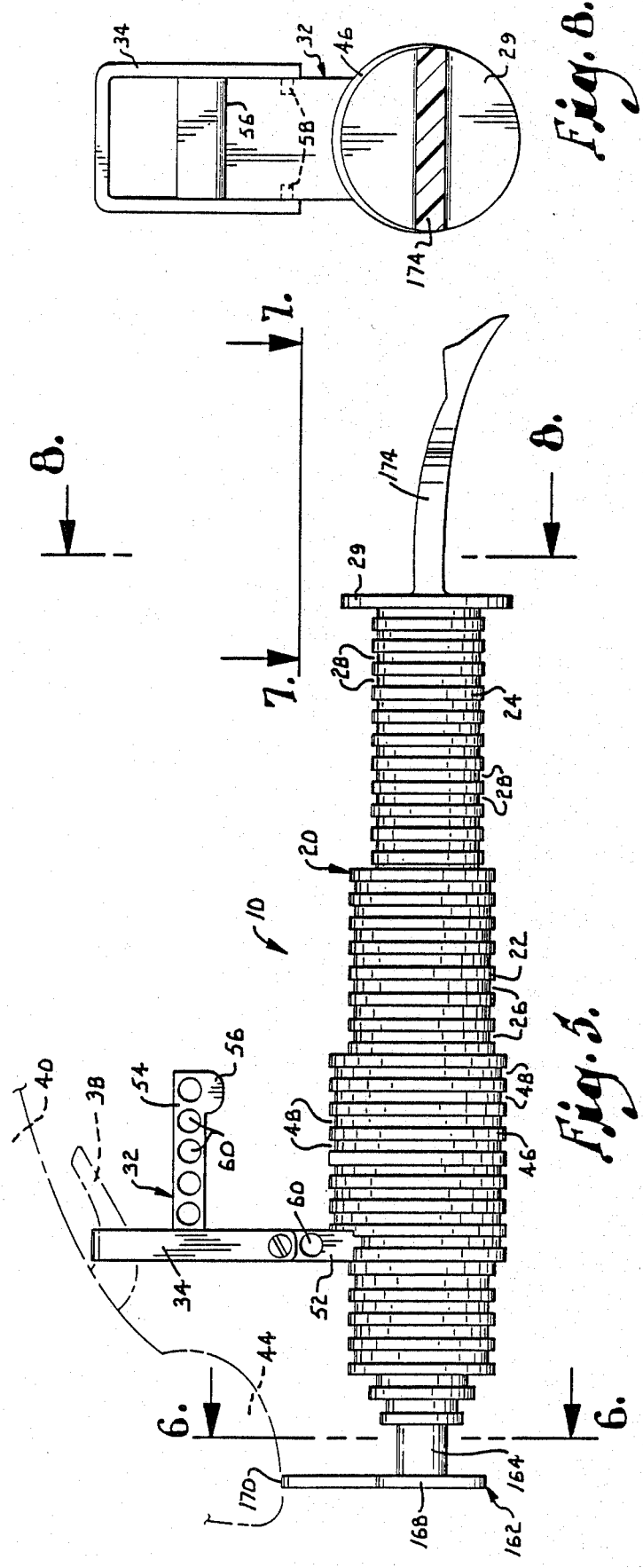
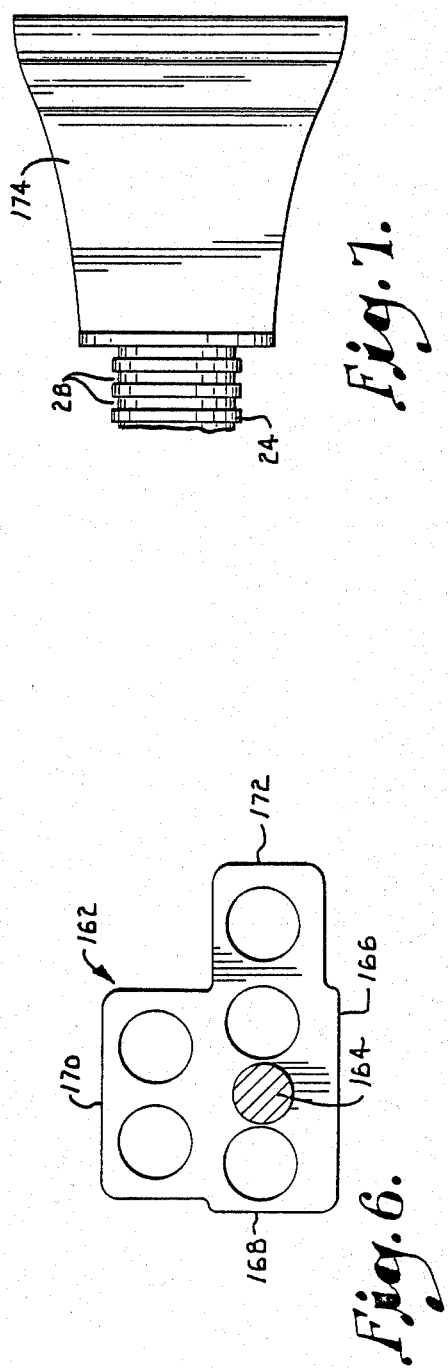

AUTOMOBILE CLOTHES HANGER BRACKET

BACKGROUND OF THE INVENTION

This invention relates generally to the transporting of clothes in vehicles and deals more particularly with a hanger bracket which may be used in an automobile or other vehicle to support hanging garments.

Many vehicles are equipped with small clothing hooks which are typically located above the rear windows. Although a small number of garments can be hung on this type of hook without difficulty, the conventional automobile hook is incapable of handling larger volumes of clothes such as garments transported by persons traveling for business or pleasure or persons transporting garments to or from a commercial cleaner.

In order to accommodate larger volumes of hanging clothes, long bars with loops on the opposite ends are often suspended from the automobile hooks on opposite sides of the vehicle. This type of clothes bar is only useful if hooks are present across from one another on both sides of the vehicle. Even then, the bar and the clothes hung from it occupy substantially the entire back seat, thus making it unavailable for passengers. Moreover, the vision of the driver is obstructed by the bar and the clothes hanging from it. The length of the bar also makes storage of it difficult when it is not in use. Normally, the bar must be stored in the trunk, and this makes it relatively inaccessible and adds to the time and difficulty involved in setting it up and taking it down. In addition, the conventional clothing bar is unsightly and gives the vehicle an objectionable "traveling salesman" look.

Other types of vehicle clothes hangers that have been proposed are subject to many of the same shortcomings and to other problems as well. For example, U.S. Pat. Nos. 2,532,909 and 2,617,571 to Hart disclose hanger bars that extend across the entire width of the vehicle. The device shown in U.S. Pat. No. 2,526,285 to Schuyler is equally unsatisfactory because of the need for a special mounting bracket. Although the devices disclosed in U.S. Pat. Nos. 3,002,666 to Silverman, 3,275,161 to Robertson and 3,708,093 to Toms can be hung on a single automobile hook, all of these devices are lacking in versatility and are unsatisfactory in a number of additional respects. None of the devices disclosed in the aforementioned patents has met with significant commercial success, in large part because of the shortcomings mentioned above.

SUMMARY OF THE INVENTION

The present invention provides an automobile clothing hanger bracket which is improved in a number of respects over what has been proposed in the past. In accordance with the invention, a hanger arm or bar on which clothes hangers are hung has a special telescopic construction which allows its length to be adjusted as desired. The two telescoping tubes which form the hanger bar can be extended to increase the capacity of the device and can be retracted for compact storage or when large capacity is not needed. The device is compact enough when retracted that it can easily be stored in a glove box or under the automobile seat where it is readily accessible when needed.

A particularly important feature of the invention is the versatility of the hanger bracket and particularly its ability to be mounted on either side of the vehicle either on an automobile hook or a grab bar of the type commonly provided on many vehicles. The device includes both an L-shaped hook element having a configuration permitting it to be hooked on a grab bar and a pivotal bail which may be extended and hung on a clothing hook in the vehicle or retracted to a storage position when not needed.

Both the L-shaped hook and the bail are adjustable to provide further versatility allowing the bracket to accommodate variations in the vehicle style or the location of the grab bar or clothing hook. The hook element and the bail are mounted together on a sleeve which is adjustable in and out to accommodate the particular location of the grab bar or hook. The bail can be adjusted separately both vertically and horizontally on the hook element to provide the bail with additional adjustability.

The telescoping tubes are provided with circumferential grooves allowing the garment hangers to be received in the grooves in order to hold the hangers in place. Additionally, the larger tube has a circumferential lip which fits in the grooves of the smaller tube, thus automatically locking the two tubes together and yet permitting them to be extended or retracted when desired. The sleeve locks on the larger tube in a similar manner.

The invention is further characterized by an adjustable brace which engages the window frame in a manner to stabilize the hanger bar and assist in maintaining its horizontal orientation. One form of the brace has a toothed ratchet type construction which functions to lock the brace to the hanger arm and yet allows it to be adjusted up and down as necessary to properly engage the window frame. Another form of the brace is a cam which may be turned about the axis of the hanger bar in order to adjust the distance between the hanger bar and the surface of the cam which engages the window frame.

Additional features of the invention include its compact construction which leaves the back seat available for passengers and avoids obstructing rearward vision of the driver, its attractive appearance, and its simple and economical construction.

DESCRIPTION OF THE DRAWINGS

In the accompanying drawings which form a part of the specification and are to be read in conjunction therewith and in which like reference numerals are used to indicate like parts in the various views:

FIG. 5 is a front elevational view showing the bracket mounted on an automobile clothing hook as an alternative to mounting it on the grab bar, with the bracket shown in FIG. 5 equipped with an ice scrapper on one end and with a modified brace on the opposite end;

FIG. 6 is a sectional view taken generally along line 6—6 of FIG. 5 in the direction of the arrows;

FIG. 7 is a fragmentary top plan view taken generally along line 7—7 of FIG. 5 in the direction of the arrows; and FIG. 8 is a sectional view taken generally along line 8—8 of FIG. 5 in the direction of the arrows.

DETAILED DESCRIPTION OF THE INVENTION

Figure 1:
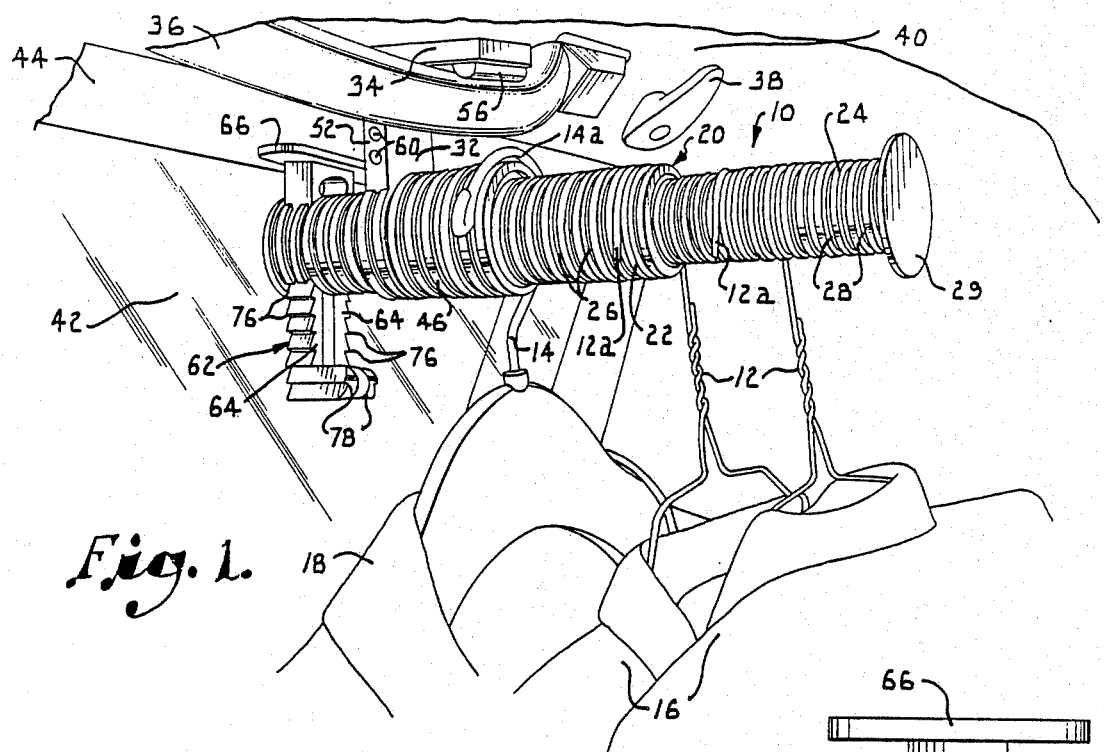
FIG. 1 is a perspective view of a clothing bracket constructed according to one embodiment of the present invention, with the bracket mounted on a grab bar in the interior of a vehicle and the clothing rod fully extended.

Referring now to the drawings in more detail, numeral 10 generally designates an automobile clothes hanger bracket on which various types of garments may be hung. For example, conventional clothing hangers 12 and 14 of the type shown in FIG. 1 can be used to hang garments such as shirts 16 and coats 18 from the hanger bracket 10.

The garments are hung on a cylindrical hanger arm or rod which is generally identified by numeral 20 and which is formed by a pair of telescoping tubes 22 and 24. The tubes 22 and 24 are cylindrical and have substantially the same length, although tube 24 is smaller in diameter than tube 22 in order to fit telescopically in the larger tube. The smaller tube 24 fits in an open end of tube 22 and may be extended and retracted telescopically between the fully extended position shown in FIG. 1 and the fully retracted position shown in solid lines in FIG. 2. In the fully extended position, the overall length of rod 10 is nearly twice its length in the retracted position.

The larger tube 22 is provided on its outside surface with a plurality of spaced apart circumferential grooves 26 which are each wide enough to receive the hook portion 12a or 14a (see FIG. 1) of one of the hangers 12 or 14. The smaller tube 24 is provided with similar circumferential grooves 28 which are likewise wide enough to receive the hook portions 12a and 14a of the hangers. The fit of the hooks 12a or 14a in each groove 26 or 28 is preferably rather close so that the hangers are held in place and cannot slide axially on the hanger rod 20 to any significant extent. The free end of the smaller tube 24 has an enlarged disk 29 which prevents hangers from sliding off of it.

Figure 2:
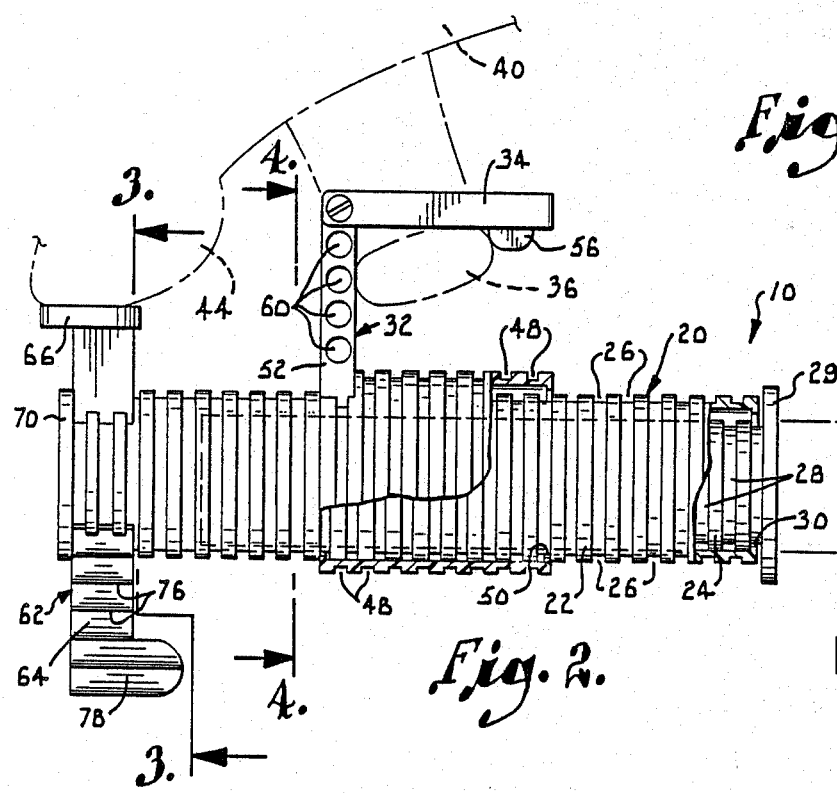
FIG. 2 is a front elevational view of the bracket shown in FIG. 1, with the solid lines showing the fully retracted position of the hanger rod and the phantom lines showing the fully extended position.

The open end of the larger tube 22 is provided with a circular lip 30 which projects inwardly toward the smaller tube 24. Gravity causes the inner tube 24 to drop such that whichever one of its grooves 28 is in registration with the lip 30 receives the lip 30 at the bottom, as best shown in FIG. 2. The fit of lip 30 in groove 28 locks the two tubes 22 and 24 together against axial movement. However, when it is desired to extend or retract tube 24, it can be lifted upwardly until lip 30 is displaced from the groove 28. Tube 24 can then be freely extended and retracted axially to the desired position. When tube 24 is again released, whichever groove 28 is then in alignment with lip 30 registers with lip, and tube 24 is again locked to the larger tube 22.

The bracket 10 is equipped with an L-shaped hook element 32 and with a U-shaped bail 34 which provide alternatives for supporting the bracket 10 in the vehicle. It is noteworthy that the bracket 10 may be installed in a vehicle which includes either a grab bar 36 or a clothing hook 38 or both. The grab bar 36 is mounted on the ceiling 40 of the vehicle interior adjacent to a rear window 42 surrounded by a window frame which includes an upper frame member 44 extending across the top of the window opening. The clothing hook 38 is also typically located on the ceiling 40 adjacent to the window 42. Many vehicles include only a grab bar 36 or only a clothing hook 38, and the bracket 10 of the present invention can be applied to either of these ceiling mounted members so that the bracket is useful with the vehicle that is equipped with either a grab bar 36 or a clothing hook 38 or both. Typically, the grab bars 36 or hooks 38 are provided on the ceiling adjacent to both sides of the vehicle, and the bracket 10 can be mounted to either grab bar or either hook.

The hook element 32 and bail 34 are mounted on a cylindrical sleeve 46 which may be adjusted along the length of the hanger rod 20. The sleeve 46 is fitted on the larger tube 22 loosely enough that the sleeve can be slid along the length of tube 22. This adjustability of the sleeve 46 permits the hook element 32 and bail 34 to be positioned as desired to properly engage with the grab bar 36 or clothing hook 38. Sleeve 46 preferably has a plurality of spaced apart circumferential grooves 48 in its exterior so that the hooks 12a and 14a of the clothing hangers may be applied to the sleeve and received in its grooves 48. The end of sleeve 50 closer to the free end of tube 22 is provided with a circular lip 50 which projects inwardly from the sleeve, as best shown in FIG. 2. Lip 50 functions in the same manner as lip 30 to lock the sleeve in place. The weight of the hanger rod 20 causes tube 22 to drop such that the lip 50 is received in whichever groove 26 is in alignment with the lip. This locks sleeve 46 in place on the hanger rod 20. Rod 20 can be lifted to disengage lip 50 from the groove 26, thus allowing sleeve 46 to be slid along tube 22 to the desired position. When the rod 20 is released, lip 50 is received in whichever groove 26 is then in alignment with it, and the sleeve 46 is automatically locked in place on rod 20 in this manner.

As previously indicated, the L-shaped hook element 32 may be used to hook bracket 10 on the grab bar 36. The hook element 32 includes a vertical leg 52 which extends upwardly from sleeve 46. As best shown in FIG. 5, a horizontal arm 54 extends from the top end of leg 52 and has a downturned bead 56 on its outer end. This construction permits the arm 54 to hang on the grab bar 36, with the bead 56 acting to prevent the hook element 32 from accidentally disengaging from the grab bar. Leg 52 and arm 54 are flat, plate-like members which provide wide areas of contact with the grab bar.

The bail 34 is a U-shaped member which is mounted on the hook element 32 and is adjustable thereon. As best shown in FIG. 8, the legs of bail 34 are provided on their free ends with inwardly projecting pins 58 which are axially aligned with one another. The pins 58 may be received in aligned openings 60 which are formed in the opposite side edges of both the leg portion 52 and the arm portion 54 of the hook element 32. The openings 60 in leg 52 are spaced vertically, while the openings 60 in the arm 54 are horizontally spaced. Consequently, bail 34 can be adjusted up or down by fitting its pins 58 in selected pairs of the vertically spaced openings in leg 52, while the bail can be adjusted horizontally by fitting the pins 58 in selected pairs of the horizontally spaced openings 60 in the arm 54.

The legs of bail 34 can be spread apart in order to remove pins 58 from the openings 60. When released, the legs of the bail move together such that the pins 58 are retained in place in openings 60. Pins 58 are also able to rotate in openings 60 so that bail 34 can pivot between the horizontal storage position shown in FIG. 2 and the vertical functional position shown in FIGS. 5 and 8. In the storage position, the bail 34 extends around and occupies the same plane as the horizontal arm 54 of the hook element 32. In the functional position, the bail 34 extends upwardly above and occupies the same plane as the vertical leg 52 of the hook element. In the functional position, the bail 34 can be hooked on the clothing hook 38 in order to support the bracket 10 thereon, as best shown in FIG. 5.

Figure 3:
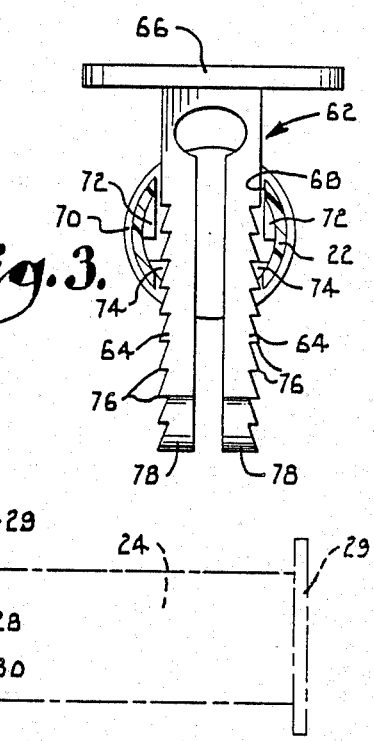
FIG. 3 is a sectional view taken generally along line 3—3 of FIG. 2 in the direction of the arrows.
Figure 4:
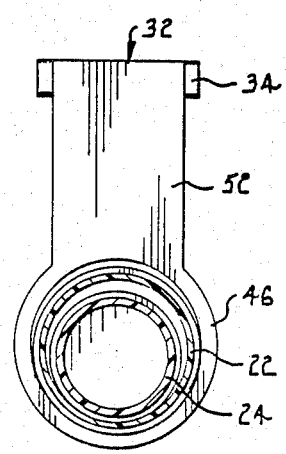
FIG. 4 is a sectional view taken generally along line 4—4 of FIG. 2 in the direction of the arrows.

The bracket 10 is equipped with a brace which provides stability and helps to maintain the hanger rod 20 in a horizontal orientation. In the embodiment of the invention shown in FIGS. 1-4, the brace 62 includes a pair of vertical legs 64 which are connected at the top with a horizontal pad 66. As best shown in FIG. 3, the legs 64 extend through an opening 68 formed in the larger tube 22 at the end thereof opposite the end which receives the smaller tube 24. A disk 70 forms an end cap which closes this end of tube 22 and is retained on the tube by opposing pairs of upper lugs 72 and lower lugs 74. The lower lugs 74 are pointed in order to engage with teeth 76 which are formed on the outside surface of each leg 64.

The lugs 74 and teeth 76 provide a ratchet mechanism which is used to lock brace 72 to the hanger rod 20 and yet permit it to be adjusted up and down when desired. The lugs 24 act as catches which engage teeth 76 in order to lock the brace. Each tooth 76 has a flat lower surface and a sloping side surface. Consequently, when legs 64 are released, they assume the position shown in FIG. 3 wherein the flat lower surfaces of the teeth engage lugs 74 in order to prevent downward movement of brace 62 relative to the hanger bar. However, because of the sloping shape of the side surfaces of the teeth, brace 62 can be moved upwardly by pushing on its lower end or pulling on its upper end. In order to move the brace 62 downwardly, it is necessary to press legs 64 together until the teeth 76 have cleared the lugs 74. Then, brace 62 can be moved downwardly to the desired position and the legs 64 can be released such that they spring outwardly to engage again with the lugs 74 in order to lock the brace in the position to which it has been moved. Each leg 64 has an enlarged foot 78 on its lower end which prevents the brace from moving completely through the opening 68.

In use, bracket 10 may be supported either from a grab bar 36 or an automobile hook 38. If the grab bar 36 is used, bail 34 is pivoted to the storage position shown in FIG. 2, and the hook element is hooked on the grab bar. Brace 62 is adjusted up or down such that when the pad 66 is engaged against the underside of the frame member 44 in the manner shown in FIG. 2, the hanger rod 20 extends horizontally. Hangers 12 and 14 may then be hung on the hanger rod as desired. If a large number of garments are to be transported on the hanger bar, the smaller tube 24 is preferably extended in order to increase the capacity of the bracket. Conversely, if only a small number of garments are transported, the smaller tube 24 is preferably retracted either wholly or partially into the larger tube so that the hanger rod projects to a lesser extent into the interior of the vehicle. Whether the hanger rod is extended or retracted, it leaves a considerable part of the back seat of the automobile available for use by passengers or to transport cargo.

When the hanger rod is loaded with garments, its free end tends to move downwardly under the influence of the weight of the garments. This tendency is resisted by the brace 62 which is butted against the underside of the frame member 44 and thus prevents the free end of the hanger rod from dropping. In this manner, the brace 62 provides stability which holds the hanger rod in place and maintains it in a horizontal orientation regardless of the number of garments suspended from it. The L-shaped hook element 32 remains firmly hooked on the grab bar 36 to securely maintain the hanger bracket in a stable position.

If an automobile hook 38 is present either alone or together with the grab bar 36, bail 34 may be used to support bracket 10. If the bail is to be used, it is pivoted to its vertical position and is adjusted up and down and right and left on the hook element 32 to the desired position. The bail 34 may then be hooked over the automobile hook 38 in a manner to securely support the hanger rod 20 within the vehicle in a stable horizontal position for receiving hanging garments.

It is noted that the sleeve 46 can be adjusted along tube 22 to the desired position for hanging the bracket from the grab bar 36 or the hook 38. It is likewise noted that the brace 62 can be adjusted up or down as necessary to enable the pad 66 to butt against frame member 44 in a manner to maintain a horizontal orientation of the hanger rod.

When the bracket 10 is not being used, it can be removed from the grab bar 36 or the hook element 38, and tube 24 is preferably retracted so that the bracket assumes its most compact condition. Bail 34 should also be in its storage position. The bracket is then small enough to be stored under the automobile seat or in a glove box or other small storage area where it is readily accessible when needed.

FIGS. 5-8 show the clothing bracket 10 utilizing a modified brace which is generally identified by reference numeral 162. The brace 162 is an eccentric cam member which is carried on a rod 164 which projects from the end of the larger tube 22. The cam 162 is a plate member having one flat edge 166 which is located closer to the rod 164 than the remaining flat edges 168, 170 and 172. The edge 168 is located closer to rod 164 than edge 170 which is in turn closer to the rod than the last edge 172. Any one of the edges 166, 168, 170 or 172 can be selected to butt against the underside of the frame member 44, and the brace 162 can be turned about the axis of rod 164 until the selected edge is located above the rod in position to butt against the frame member. This is accomplished by turning tube 24 and rod 164 relative to the rest of the bracket assembly.

Because of the eccentricity of the cam member about the rod 164, the distance of the hanger rod 20 below frame member 44 can be adjusted depending upon which of the edges is selected. For example, if edge 170 is selected as shown in FIG. 5, the axis of rod 20 is located below the frame member 44 by a distance equal to the distance of edge 170 from the center of rod 164. The hanger rod 20 can be lowered by selecting edge 172, or it can be raised somewhat by selecting edge 168. It can be raised even further by selecting edge 166. Whichever edge is selected will depend upon the location of the grab bar 36 or the hook 38 relative to the frame member 44 against which the brace butts. As shown in FIG. 6, the edge of brace 162 which is selected maintains rod 20 in a horizontal orientation. It is also noted that the bail 34 may be adjusted up or down to accommodate whichever of the edges of the cam is selected.

As best shown in FIGS. 5 and 7, a conventional ice scraper 174 may be mounted on the disk 29 located on the end of tube 24. Tube 24 may be removed from the larger tube 22 and can then serve as a handle for the ice scraper 174, permitting it to be used to scrape ice from windshields and the like. It should be evident that the scraper 174 can be provided on tube 22 regardless of which of the braces 62 or 162 is used.

It is thus evident that the present invention provides an automobile clothing bracket which exhibits considerable versatility in that it can be supported from either a grab bar 36 or a clothing hook 38, its length can be adjusted, the position of sleeve 46 along the length of the hanger rod can be adjusted, the bail 34 can be adjusted both up and down and left and right, and the braces 62 and 162 can be adjusted to accommodate variations in the location of the grab bar or clothing hook relative to the window frame. At the same time, the bracket assumes a compact position for storage and presents an attractive appearance which does not give the vehicle a "traveling salesman" look which is objectionable to many people. The bracket can be mounted on either side of the automobile and does not significantly obstruct the vision of the driver or occupy an undue part of the back seat of the automobile, even when the hanger rod 20 is fully extended. The grooves 26, 28 and 48 hold the hangers 12 and 14 in place and at the same time cooperate to automatically lock the tubes and sleeve together. It is contemplated that the parts of the bracket assembly may be injected molded plastic or any other suitable material which exhibits the required strength.

From the foregoing, it will be seen that this invention is one well adapted to attain all the ends and objects hereinabove set forth together with other advantages which are obvious and which are inherent to the structure.

It will be understood that certain features and subcombinations are of utility and may be emplyed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A clothing hanger bracket for a vehicle having a clothing hook and/or a grab bar adjacent the body of the vehicle, said bracket comprising:
   an elongate hanger arm adapted to receive clothes hangers in suspension therefrom, said arm having opposite ends;
   hook means on said arm intermediate the opposite ends thereof for hooking onto the grab bar to support the arm thereon in a substantially horizontal orientation;
   a hanger bail on said arm intermediate the opposite ends thereof at a location to hang on the clothing hook of the vehicle in a manner to support the arm thereon in a substantially horizontal orientation, said hook means and bail serving as alternatives for supporting the hanger arm in the vehicle; and
   a brace extending from said hanger arm adjacent one end thereof and having a surface arranged to butt against the vehicle body in a manner to maintain the hanger arm in a substantially horizontal orientation when same is loaded and supported from either the grab bar or clothing hook.

2. The bracket of claim 1, wherein said bail is connected with said hook means.

3. The bracket of claim 1, including means for adjusting the hook means and bail along the length of said arm means.

4. The bracket of claim 1, including means for adjusting said brace in a manner to vary the distance of said surface of the brace away from the hanger arm.

5. The bracket of claim 1, including a sleeve mounted for sliding movement along the length of said hanger arm, said hook means being carried on said sleeve.

6. The bracket of claim 5, wherein said bail is carried on said sleeve.

7. The bracket of claim 5, wherein:
   said hook means comprises a generally L-shaped hook element extending from said sleeve and including a generally vertical leg member and a generally horizontal arm member; and
   said bail is connected with said hook element.

8. The bracket of claim 7, including means for connecting said bail with said hook element in a manner permitting the bail to pivot on the hook element between an extended position wherein the bail may be hung on the clothing hook of the vehicle and a retracted position wherein the bail extends generally along the hook element for storage when not in use.

9. The bracket of claim 7, including means for adjusting said bail along the leg and arm members of said hook element.

10. The bracket of claim 1, including:
    means for adjusting said brace up and down on said hanger arm to vary the distance of said surface of the brace away from the arm; and
    releaseable means for locking said brace to said arm.

11. The bracket of claim 10, wherein said releaseable means includes:
    a plurality of teeth on said brace spaced apart lengthwise thereon; and
    a catch element on said hanger arm for engaging the teeth in a manner to lock the brace to the arm, said teeth being selectively disengageable from said catch element to permit lengthwise adjustment of the brace on the arm.

12. The bracket of claim 1, wherein:
    said brace comprises a cam member and said surface thereof comprises a cam surface which is eccentric about the hanger arm; and
    said cam member is rotatable about the hanger arm.

13. The bracket of claim 12, including flats on said cam surface for engagement with the vehicle body.

14. A clothing hanger bracket for a vehicle having a ceiling mounted element adjacent a window frame, said bracket comprising:
    an elongate hanger arm adapted to receive clothes hangers in suspension therefrom, said arm having opposite first and second ends;
    a sleeve mounted on said arm for adjustable sliding movement along the length thereof between said first and second ends;
    hanger means on said sleeve projecting upwardly therefrom for engagement with the ceiling mounted element of the vehicle to support the arm therefrom in a substantially horizontal orientation with said first end adjacent the window frame and said second end spaced from the window frame in the interior of the vehicle; and
    a brace extending upwardly from said hanger arm adjacent said first end, said brace having a surface for butting against the window frame to stabilize the arm and maintain same in a substantially horizontal orientation when loaded.

15. The bracket of claim 14, including:
a plurality of grooves around said hanger arm each wide enough to receive a clothes hanger therein; and
an inwardly projecting lip on said sleeve at a location to be received in said grooves in a manner to lock the sleeve to the arm, said lip being removable from the grooves to permit sliding of the sleeve along the hanger arm.

16. The bracket of claim 14, wherein said hanger means comprises:
hook means for hooking onto the ceiling mounted element if same comprises a grab bar; and
a hanger bail for hanging on the ceiling mounted element if same comprises a clothing hook, said hook means and bail being alternatives for hanging the hanger arm in the vehicle.

17. The bracket of claim 14, wherein said hanger arm comprises a pair of tubes telescopically interfitting and being extensible and retractable telescopically to adjust the length of the hanger arm.

18. A clothing hanger bracket for a vehicle, said bracket comprising:
an elongate hanger arm comprising first and second tubes telescoped one within the other in a manner to permit telescopic extension and retraction of the second tube to adjust the length of the hanger arm;
a plurality of spaced apart grooves extending around each of said first and second tubes, each groove having a width to receive a clothing hanger hook therein to hang the hanger from said hanger arm; and
means for hanging said hanger arm in the vehicle in a substantially horizontal orientation with the first tube located adjacent one side of the vehicle and the second tube presenting a free end of the arm disposed away from said one side of the vehicle within the interior of the vehicle.

19. The bracket of claim 18, including a lip on said first tube projecting inwardly therefrom at a location to fit in the grooves of the second tube in a manner to lock the first and second tubes together, said lip being removable from said grooves of the second tube to permit telescopic extension and retraction of the first tube relative to the first tube.

20. The bracket of claim 18, including an ice scraper on the free end of the second tube, said second tube being removable from the first tube and being adapted to serve as a handle for the ice scraper when removed from the second tube.

* * * * *